Patented Apr. 30, 1940

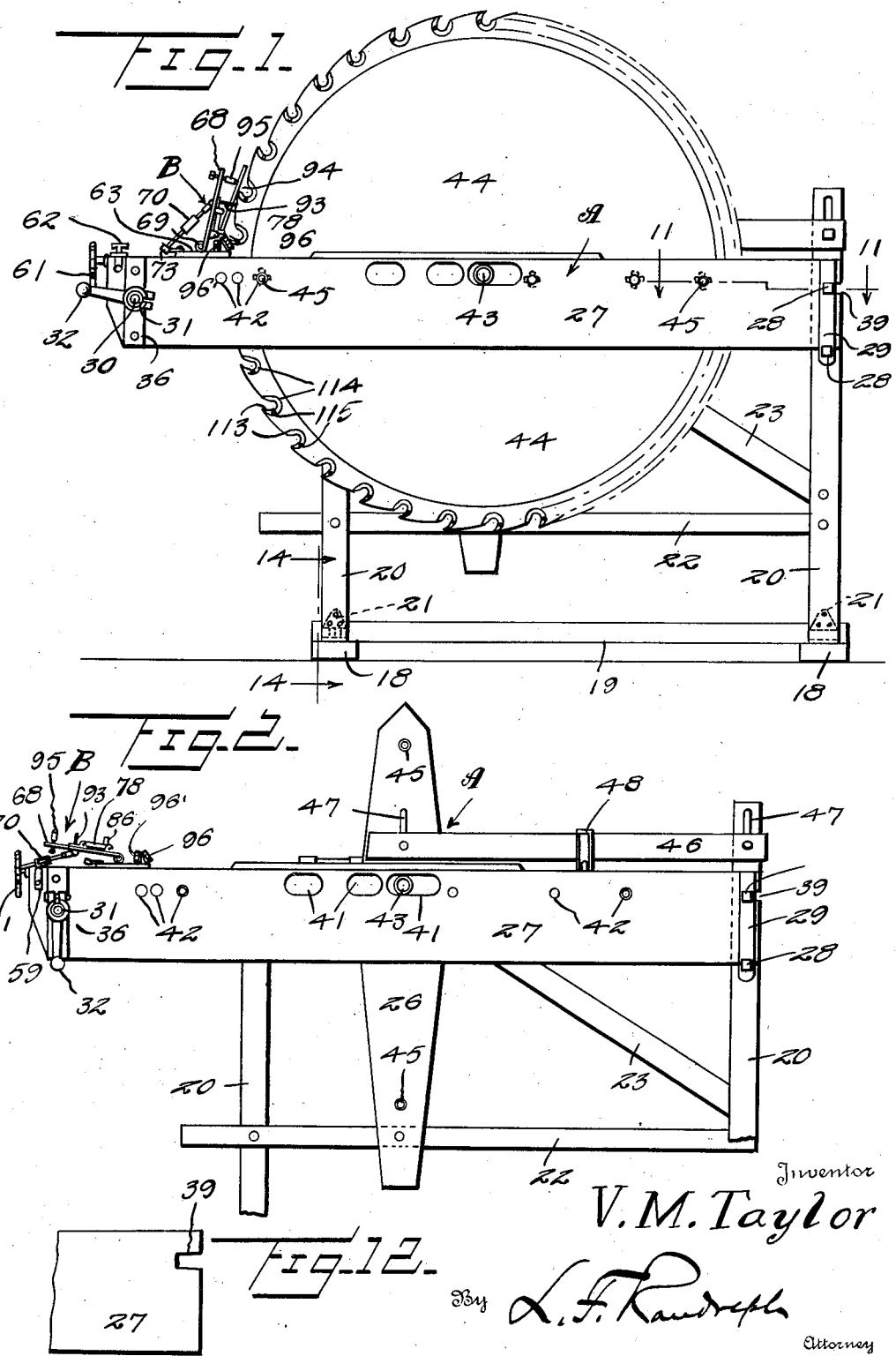

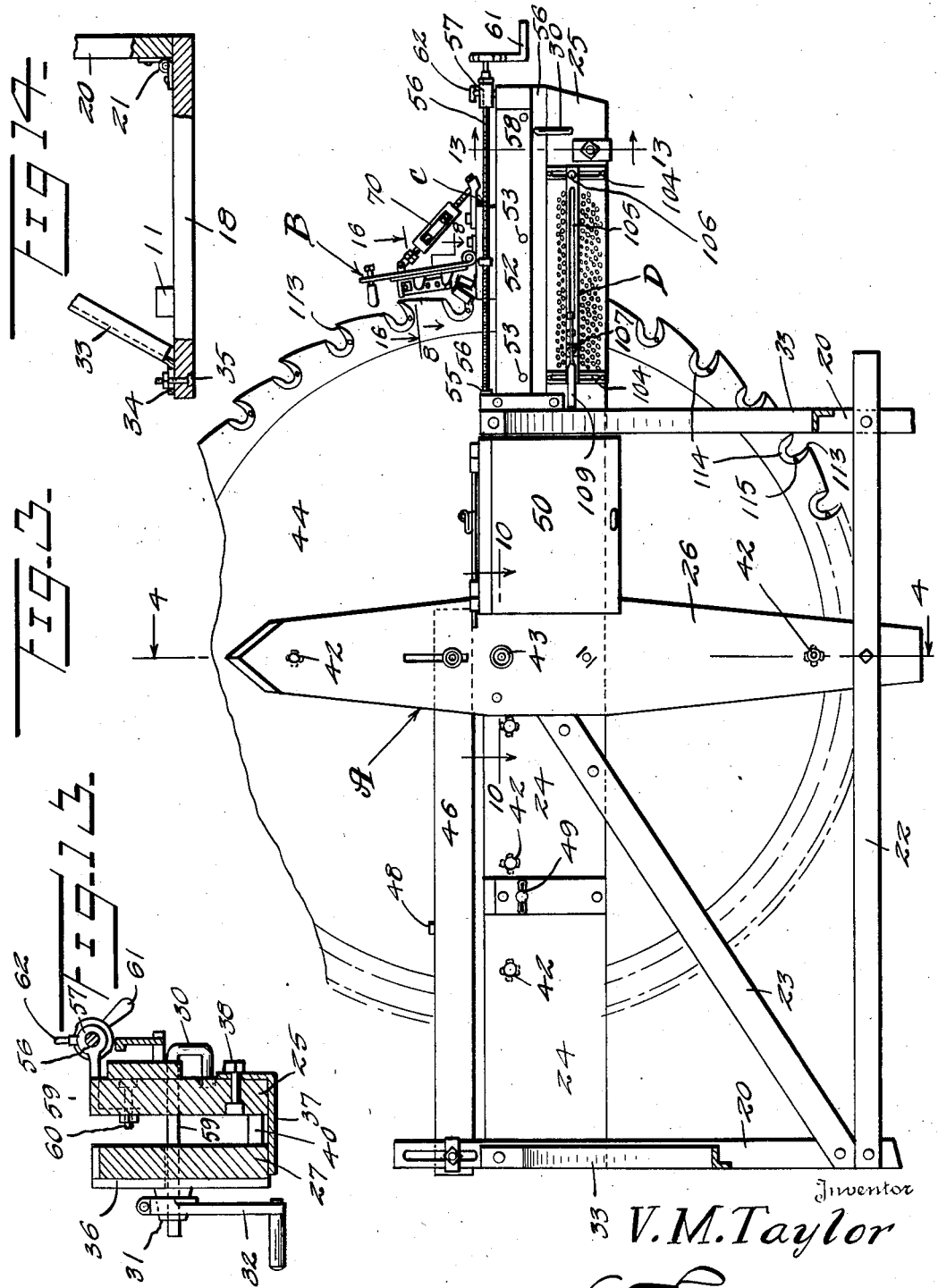

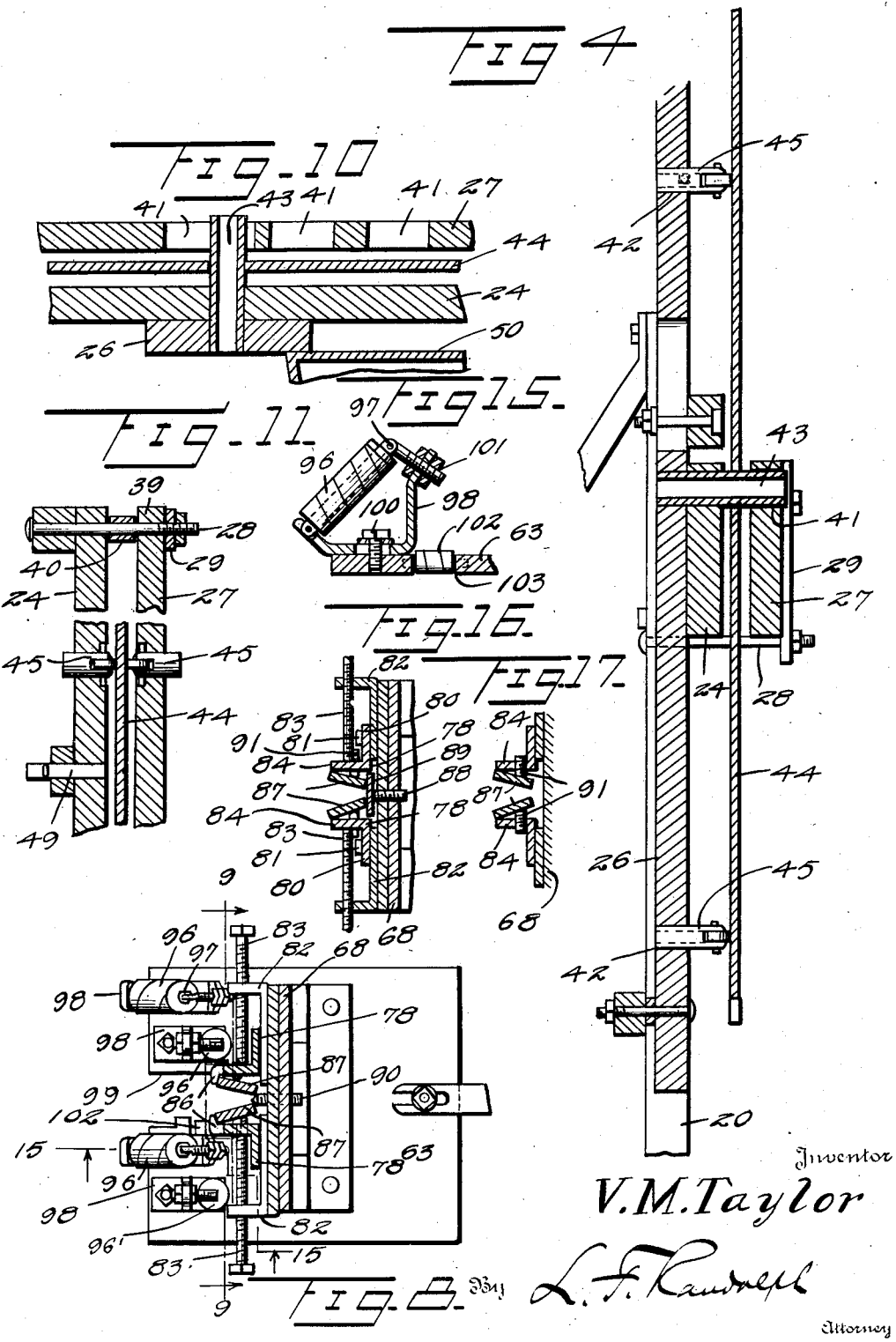

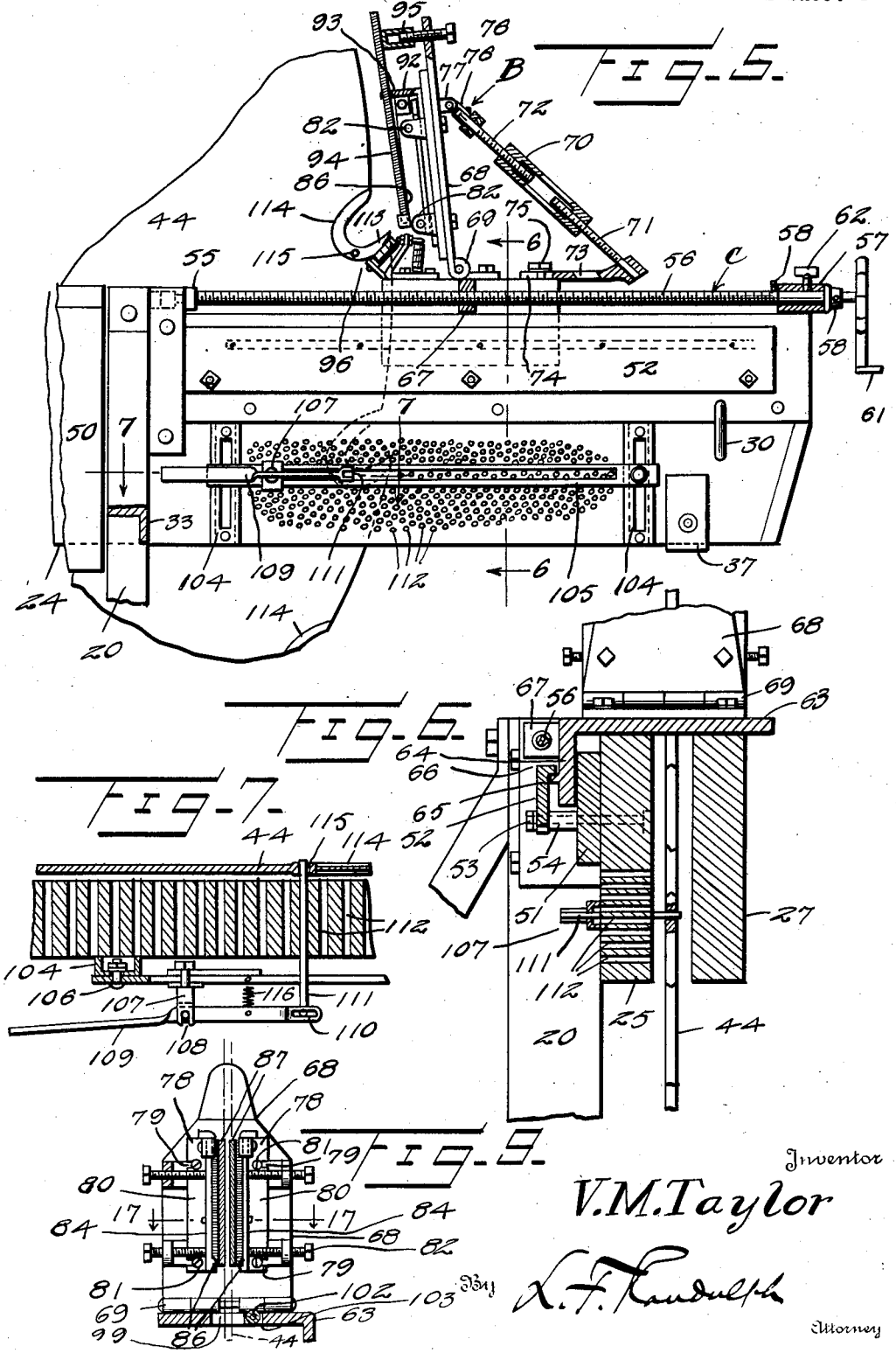

2,199,324

UNITED STATES PATENT OFFICE 2,199,324

DEVICE FOR FILING CIRCULAR SAWS

Victor Mitchell Taylor, Tazewell, Va.

Application July 19, 1938, Serial No. 220,103

8 Claims. (Cl. 76—31)

This invention relates to an improved filing device for circular saws of various diameters and of various makes having teeth of different construction and arranged at various spaced intervals relatively to each other.

It is a particular aim of this invention to provide a filing device which can be economically constructed and easily operated to uniformly file the teeth of a circular saw so that the exposed portion of each tooth will be of a uniform size and uniformly positioned relatively to the saw.

It has been customary to file the teeth of circular saws, for the purpose of sharpening, when necessary without any attempt to insure a uniform operation on each of the teeth, so that this and the additional fact that circular saws are provided with teeth which may be replaced, usually results in a saw having teeth of various lengths and widths. The teeth which are wider will naturally tend to cut a wider kerf momentarily checking the speed of rotation of the saw or breaking off the tooth; while the longer teeth will cut a deeper kerf which will likewise either check the momentum of the saw or break the tooth. The longer and wider teeth thus cut a kerf in the material so that the narrower and shorter teeth do not reach the material being cut and as a result do not function thereby increasing the time required to cut the material and burdening the machinery driving the saw with a periodic excessive load which tends to cause unnecessary wear thereon and unnecessary expense of operation.

This invention is aimed to provide a saw sharpening apparatus for filing the front, back, sides and cutting edge of each saw tooth uniformly so that each tooth will be of the same width and length.

More particularly, it is an object of this invention to provide means for removably and rotatably mounting circular saws of various diameters, and a sharpening device carried by said saw supporting means and movable relatively thereto for successively engaging the sides and back edges of the teeth, alternately as desired, when the saw is revolved so that the sides and back of each tooth will be ground uniformly.

Still a further object of the invention is to provide guide rollers carried by said sharpener, adjustably mounted thereon and angularly adjustable relatively to each other, for guiding a hand file used in grinding the front and back of the tooth to insure uniformity.

Still a further object of the invention, is to provide conveyor means for moving the sharpening device toward and away from the saw teeth and for adjusting it for engagement with saws of various diameters; and a stop mechanism mounted for longitudinal and lateral adjustment relatively to the support to selectively engage the teeth retaining rings of the saw to successively position the teeth between said guide rollers.

This invention in addition to causing the saw to be revolved at a uniform speed with each of the teeth engaging the material being cut, results in a narrower kerf decreasing the waste caused by cutting, and also results in a smoother finish on the faces of the material formed by the sawing.

Many other objects and advantages of the invention will hereinafter become more fully apparent from the following description of the drawings which illustrate a preferred form of the apparatus, and wherein—

Figure 1 is a rear elevational view of the device showing a circular saw mounted therein, with the device arranged and positioned for sharpening and bevelling the cutting edge of the teeth, Figure 2 is a view similar to Figure 1 showing the device with the saw removed and the sharpening mechanism in an inoperative position, Figure 3 is a fragmentary side elevational view of the apparatus, from the opposite side as seen in Figure 1, with the sharpening mechanism arranged for grinding the opposite sides of the teeth, Figure 4 is a vertical central sectional view taken on the line 4—4 of Figure 3, Figure 5 is an enlarged side elevational view of one end of the apparatus, showing the means for selectively positioning each of the teeth for the hand grinding operation and showing the sharpening apparatus assembled to sharpen the cutting edge of the teeth, Figure 6 is a transverse vertical sectional view taken on the line 6—6 of Figure 5, Figure 7 is a horizontal sectional view taken on the line 7—7 of Figure 5, Figure 8 is a horizontal sectional view taken on the line 8—8 of Figure 3, Figure 9 is a vertical sectional view taken on the line 9—9 of Figure 8, Figure 10 is a horizontal sectional view taken on the line 10—10 of Figure 3, Figure 11 is a horizontal sectional view taken on the line 11—11 of Figure 1, Figure 12 is a fragmentary elevational view of one end of the removable means, Figure 13 is a transverse vertical sectional view taken on the line 13—13 of Figure 3, Figure 14 is a vertical sectional view taken on the line 14—14 of Figure 1, Figure 15 is a vertical sectional view taken on the line 15—15 of Figure 8, Figure 16 is a horizontal sectional view taken on the line 16—16 of Figure 3, and Figure 17 is a horizontal sectional view taken on the line 17—17 of Figure 9.

Referring more particularly to the drawings, wherein like reference characters designate like or corresponding parts throughout the different views, the invention comprises a combination of a blade supporting frame A, the blade sharpening mechanism B, the conveyor C and the blade holding mechanism D.

The frame A includes the corresponding spaced base members or sills 18 connected by one or more braces 19, two uprights or standards 20 which are mounted on and connected to the members 18 by means of the hinges 21, and the horizontal and diagonal braces 22 and 23 respectively which are connected to the uprights 20. As best seen in Figure 3, frame A, is provided with a horizontally disposed beam 24 which is secured to the uprights 20 and which has one end designated 25 projecting beyond one of the uprights 20. A vertical guide member 26 is secured to the outer side of the beam 24 intermediate of its ends, and is braced at its lower end to the horizontal brace 22. As seen in Figure 3, the upper end of the diagonal brace 23 is secured to the beam 24 adjacent the member 26. A movable beam 27 is disposed parallel to the beam 24 and on the opposite side thereof relatively to the member 26 and is removably mounted at one end by the adjustable fastenings 28 and plate 29, and at its opposite end by a threaded bolt 30 and a nut 31 having a crank handle 32. Fastenings 28 and 30 are secured to the stationary beam 24, and the fastening 30, as best seen in Figure 13 is provided with the downwardly and inwardly turned end extending into a recess in the beam 24 to prevent its turning relatively thereto. As seen in Figure 14, the uprights 20 are braced by means of the diagonally arranged braces 33 which are slotted at their lower ends, as indicated at 34, to be adjustably positioned on the sills 18 by the nut and bolt fastenings 35, to angularly adjust the frame A relatively to its sills 18 so that the uprights 20 will be substantially in a vertical plane.

Referring to Figure 13, it will be noticed that the removable beam 27 of the frame A is provided with a wear plate 36 through which the bolt 30 extends, and that an angular shaped supporting member 37 is rigidly secured to the beam 24 by the fastening 38 and has its free end disposed to support one end of the beam 27 beneath the bolt 30. As best seen in Figure 12, the opposite end of the beam 27 is provided with a notch 39 adapted to be engaged by one of the fastenings 28 to retain the opposite end of said beam in alignment with the beam 24. Beam 24 is provided with a plurality of spacing members 40, one of which is seen in Figure 13, and which are adapted to retain the beam 27 in properly spaced relationship to the beam 24, for a purpose which will hereinafter be described.

As seen in Figure 2, the beam 27 is provided with a plurality of slots 41 and a plurality of spaced openings 42. The slots 41 are adapted to selectively receive a stub shaft 43 the opposite end of which is mounted in beam 24 and member 26, as seen in Figure 3. The stub shaft 43 forms an axis for the circular saw blade 44 which is mounted thereon, while the beam 27 is removed, after which the beam 27 is applied to the frame A and secured by means of the fastenings 28, 30 and 31, as heretofore described, to retain the blade 44 in position on the frame A between beams 24 and 27. Openings 42 are adapted to selectively receive the inwardly projecting guide rollers 45, as best seen in Figure 4, and the beam 24 and guide member 26 are likewise provided with openings 42 to receive the corresponding guide members 45 which are positioned to engage against the opposite sides of the saw 44, adjacent its periphery, to retain the saw in proper alignment while being revolved on its axis 43.

As a matter of convenience, the frame A may be provided with a vertically adjustable beam 46 adjustably positioned by means of the slots 47 in one of the end members 20 and in the guide member 26, to support a file guide 48 for filing small diameter saws which are journaled on the removable pin 49, as seen in Figure 3. Certain of the openings 42 in the beams 24 and 27 are provided to receive the guide rollers 45 when the frame A is used to support a small diameter saw. A tool box 50, as seen in Figure 3, may be mounted on the outer side of the beam 24, if desired.

As best seen in Figure 6, end 25 of beam 24 is provided with a longitudinally disposed plate 51 which is mounted adjacent the upper edge thereof on its under side, and a plate 52 disposed parallel and in spaced relationship to the plate 51. Plates 51 and 52 are mounted on end 25 and held in spaced relationship to each other by the fastening 53 and the spacing sleeves 54, respectively.

A socket 55 is mounted on one of the uprights 20 above the end 25 to receive the reduced end of a threaded rod 56, forming a part of the conveyor C, the opposite end of which is enclosed in a socket 57 and held against longitudinal movement relatively thereto by the bolts 58 mounted on the rod 56 and bearing against the ends of the socket 57. Socket 57 is supported by an angular shaped extension 59 which extends over and down the inner side of the end 25 and is secured thereto for ready removal by the nut and bolt fastening 60. Rod 56 is swivelly mounted by means of the socket 55 and the sleeve 57 and is adapted to be rotated by means of the crank handle 61 or to be held rigid by tightening the set screw 62 which is mounted in the sleeve 57 and movable into engagement with rod 56.

The sharpening mechanism B includes a carrier plate, as seen in Figure 6 designated 63 which is slidably mounted on the upper edge of the end 25 and the corresponding portion of beam 27, and which is provided with a depending portion 64 extending downwardly between plates 51 and 52 and provided with an outwardly extending rib 65 adapted to engage the under side of an inwardly extending flange 66 on the plate 52 to retain the carrier 63 in engagement with end 25 and beam 27. A lug 67 projects outwardly from the portion 64 and is provided with an internally threaded opening adapted to engage rod 56 to move the carrier longitudinally of end 25 and beam 27 when the threaded rod 56 is revolved.

A plate 68, as best seen in Figure 5, is hinged at 69 to the upper side of the carrier 63 and is angularly adjustable relatively thereto by means of the turnbuckle 70. Turnbuckle 70 is adjustably connected to the threaded bolts 71 and 72, the former of which is connected to the supporting member 73 having a slot 74 opening outwardly of one end thereof and adapted to be removably connected to the rear end of the carrier 63 by a headed screw 75 engaging the slot 74. The opposite end of the bolt 72 is pivotally connected to a sleeve 76 which in turn is pivotally connected to a lug 77 projecting from the back face of the plate 68. These last mentioned pivots are disposed at right angles to each other so that the turnbuckle 70 may be moved horizontally and vertically when the member 73 is disconnected from the screw 75 to position it on either side of the plate 68 when it is thrown back, as seen in Figure 2.

As best seen in Figures 8, 9 and 16, a pair of angular shaped members 78 are disposed longitudinally of the forward side of the plate 68 and are provided with the slots 79 in their sides 80, which are disposed substantially parallel to the plate 68 to receive the headed screws 81 which secure the base portion of the lugs 82 to the plate 68. The outwardly extending portions of the lugs 82 are provided with threaded openings in which are mounted the set screws 83 the inner ends of which engage against the outer sides of the outwardly extending portions 84 of the members 78 and which are adjustable to move said members relatively to each other and to the plate 68 by means of the slots 79 and the screws 81. As best seen in Figure 8, sides 84 adjacent their top and bottom are provided with the inwardly projecting claws 85 and 86 respectively, adapted to engage the longitudinal edge of the files 87. Files 87 are held in engagement with the claws 85 and 86 by means of the set screw and plate 88 and 89 at their top, as seen in Figure 16, and by the set screw 90 at their bottom, which likewise tends to urge the inner edge of the files 87 away from each other. As best seen in Figure 17, sides 84 are provided with a plurality of set screws 91 which may be turned to engage the inner sides of the files 87 to move their inner longitudinal edges toward each other to angularly adjust them as desired. As will hereinafter become more fully apparent, the files 87 are ordinarily canted about as seen in Figures 16 and 17 and held in this position by the set screws 91 and the set screw 90.

As seen in Figure 5, a pair of members 92 project outwardly from above the members 78 and are provided with the inwardly extending opposed notches 93 adapted to engage the opposite longitudinal edges of a file 94, the lower end of which rests on the top of the claws 86, and which is held in engagement with said claws by means of a set screw 95 mounted in the top of the plate 68 and adapted to press outwardly on the upper end of the file 94 to urge the lower end of the file inwardly. File 94 is disposed in a plane substantially parallel to the plane of the plate 68.

The sharpening mechanism B includes also the four guide rollers 96 which are journaled on the pins 97 mounted in the supporting frames 98 which are slidably mounted on the forward end of the carrier 63, on opposite sides of its slot 99. As best seen in Figure 15, the frames 98 are slidably mounted by means of the slot and pin connection designated generally 100 and the upper ends of the pins 97 are adjustable by means of the nut and screw connection 101 to vary the angle of the rollers 96. As seen in Figure 8, there are four rollers 96, mounted by means of the members 98, two on each side of the slot 99 arranged in opposed relationship to each other with the two rollers designated 96' facing toward the plate 68. As seen in Figure 15, the pins 97 are pivotally connected at their lower ends to the supporting frames 98 and at their upper ends to the screws forming a part of the fastening 101, so that the angle of the rollers 96 and 96' may be readily varied. The rollers 96 are normally disposed at an oblique angle to the plate 63, while the rollers 96' are disposed substantially at right angles to said plate for a purpose which will hereinafter be described.

As seen in Figure 15, a roller designated 102 is mounted in a slot 103 in the carrier 63 directly beneath and between the rollers 96' for a purpose which will hereinafter be described.

The blade holding mechanism designated D, includes a pair of spaced slotted plates 104 which are mounted transversely of the outer side of the end 25 in spaced relationship to each other to slidably mount the slotted bar 105 which is slidably connected at its end by means of the nut and bolt fastening 106 to the slotted plate 104. A standard 107 is slidably mounted in the slot of the bar 105 and is provided with the cross slot 108 at its free end adapted to pivotally mount the lever 109 which extends through one of said slots and which is provided with a pin extending through the other slot, as seen in Figure 7. One end of the lever is slotted as indicated at 110 to receive a projection on one end of a plunger 111, which is selectively positioned in one of a plurality of apertures 112 in the end 25. The saw 44 is provided with the conventional sockets in its periphery, adapted to receive the saw teeth 113 which are held in said sockets by the supporting rings 114 having the openings 115, said rings and teeth being of conventional construction. Lever 109 between its pivot point and its slotted end 110 is connected to one end of a contractual spring 116 which is connected at its opposite end to a portion of the standard 107 to normally retain pin 111 in its projected position to engage the openings 115 to hold blade 44 from rotating on its axis 43. The opposite end of the lever 109, forming the handle, can be pressed inwardly to retract pin 111 so that the blade 44 can be turned, and if released will engage the next opening 115 with which it comes in contact. A plurality of apertures 112 is provided to accommodate the different sizes and makes of saws and the stop D is longitudinally and laterally adjustable by means of the slotted plate 104 and the slotted rod 105 for aligning pin 111 in any of the openings 112.

The normal operation of the device or apparatus is as follows: A saw blade 44 is first positioned in the frame A, as heretofore described, after which the conveyor C is actuated by its crank 61 to move the sharpening mechanism B forwardly until the periphery of the saw 44 is positioned in the notch or slot 99 of the carrier 63 after which screw 75 is loosened and member 73 disconnected so that the plate 68 may be thrown back to the position, as seen in Figure 2. Carrier 63 is then adjusted by means of the conveyor C until one of the teeth 113 is positioned so that its inner side is just above the plane of the outer edge of the rollers 96. A hand file, not shown, is then employed to file the inner edge of the tooth 113, which is being held by the stop mechanism D by means of its pin 11 engaging an opening 15 in the next or second lower ring 14, until the inner edge of said tooth is in a plane with the outer edge of the rollers 96. Pin 111 is then retracted and saw 44 revolved until the pin engages the opening 115 of the next succeeding ring to position the next tooth between the rollers 96, after which the next tooth is filed, as heretofore described, and the operation repeated until the inner side of all of the teeth 113 have been filed. The guide rollers 96 will insure a uniformity of filing if each tooth is filed until further filing is prevented by the rollers 96. Carrier 63 is then moved forward until the back edge of the last filed tooth is just behind the plane formed by the back edges of the rollers 96', after which the hand file is used to file the back edge of the tooth until it engages both rollers to prevent further operation of the file. The saw is then released by means of the holding mechanism D, as heretofore described, and moved until said mechanism engages the next tooth and the filing repeated until all of the teeth have been filed. A roller 102 is provided to support the file while filing the back edges of the teeth 113 to prevent it from engaging and wearing a groove in the carrier 63.

After the front and back edges of all of the teeth 113 have been filed, plate 68 is swung upwardly and the member 73 connected to the carrier 63 by the screw 75, after which the plate 68 is angularly adjusted by means of the turnbuckle 70 until the teeth 113, when the saw is revolved will move between the members 78. During this operation, file 94 is removed. Files 87 are moved toward or away from each other and angularly adjusted relatively to each other, so that they will just engage the opposite sides of the teeth 113 as it is revolved in the opposite direction to its normal cutting movement to uniformly file the sides of the teeth. This is accomplished by spinning or revolving the blade backward, and if necessary files 87 may be moved slightly after this operation has been partly completed to insure filing all of the teeth to a uniform width. The teeth have now been filed to a uniform width and thickness so that they are now of the same length and width, and the file 94 is now inserted, as heretofore described, and the carrier moved forwardly until the file engages against the upper back edge of one of the teeth, after which the blade 44 is revolved backwards to sharpen the cutting edge of each tooth to the same degree by engagement with the file 94 which bevels the back upper edge of each tooth to form a sharp uniform cutting edge.

Various modifications and changes in the construction and arrangement of the parts forming the invention may obviously be made and are contemplated, as the drawings and description thereof are only intended to illustrate a preferred form of the invention, and the right is expressly reserved to make such variations and changes as will not depart from the underlying principle of the invention as hereinafter defined by the appended claims.

I claim as my invention:

1. A saw filling apparatus comprising a frame adapted to rotatably mount circular saws of various diameters, a carrier slidably mounted on said frame having means for guiding a file adapted to engage the teeth of said saw and anti-friction means for supporting the file while engaging the saw teeth; a conveyor mounted on said frame and connected to said carrier to move it into and out of engagement with the saw teeth, and a stop adjustably mounted on said frame and movable into and out of engagement with the saw for selectively positioning the saw teeth relatively to the carrier, said stop comprising a spring pressed plunger, and means carried by the frame for adjustably positioning the plunger relatively thereto.

2. A device as in claim 1, said stop comprising a pair of spaced transversely disposed slotted plates, mounted on said frame, a slotted bar having its ends slidably connected to said plates, a standard slidably mounted in said slotted bar, a lever pivotally mounted intermediate of its ends on said standard, a pin connected to one end of said lever, a contractual spring, connected to said lever between said end and its pivot, said spring being connected at its opposite end to a portion of said standard, said frame being provided with a plurality of openings for said pin to selectively position it to engage openings in said saw, said spring normally urging said pin into engagement with the saw openings, and the opposite end of said lever forming a handle to actuate said lever against the action of said spring to retract the pin out of engagement with the openings in the saw.

3. In a saw sharpening apparatus, a frame adapted to removably and rotatably mount circular saws of various sizes, having removable teeth and removable retaining rings for supporting said teeth in the saw, a file guiding mechanism mounted on said frame and adapted to guide a file for successively sharpening the front and back edges of the teeth to uniform dimensions; and a saw positioning apparatus mounted on said frame and longitudinally and laterally adjustable relatively thereto, the positioning device including a portion of said frame provided with a plurality of spaced openings adapted to align with openings in the teeth supporting members of various types of saws, a pin selectively positioned in said openings to engage the openings in the teeth supporting members, contractual spring means normally urging said pin to a projected position, and a lever connected to the pin and operable to retract it out of engagement with the saw teeth supporting members.

4. A saw filing device comprising a frame adapted to removably and rotatably mount circular saws of various sizes, a carrier slidably mounted on said frame, guide rollers mounted on said carrier, means for angularly and longitudinally adjusting said guide rollers relatively to the carrier, a conveyor for moving said carrier relatively to the teeth of said saw; and a stop mechanism mounted on said frame to engage said saw for successively positioning the teeth thereof relatively to said guide rollers, said stop mechanism including a portion of said frame provided with a plurality of openings adapted to align with openings in teeth holding members of different size saws, a pin to selectively engage said openings, spring means normally urging said pin to a projected position for engagement with an opening in one of said teeth holding members for positioning one of the teeth between said guide rollers to be sharpened, and a lever for retracting said pin to release the saw blade.

5. A saw sharpening device comprising a frame adapted to removably and rotatably mount circular saws, a plate slidably mounted relatively to said frame and provided with a slot in one end thereof, pairs of guide rollers disposed on opposite sides of said slot and slidably mounted relatively to said plate and angularly adjustable relatively to each other, said rollers being disposed above the plate to engage a side of a hand file to support and guide the file while sharpening the teeth on a saw whereby said teeth will be sharpened to the same dimensions, an anti-friction means mounted in said plate and adapted to be engaged by one edge of said file to hold said edge out of engagement with the plate.

6. A saw sharpening mechanism comprising a circular saw support, a carrier movably mounted thereon, pairs of rollers mounted on said carrier for guiding a file while sharpening the teeth of the saw, and means for independently adjusting said rollers longitudinally of said carrier and for angularly adjusting the rollers relatively to each other, said means including a support for each of the rollers, said support having an intermediate slotted base portion to receive a fastening for adjustably securing it to the carier, one end of the support having means for pivotally mounting and end of the roller, and means adjustably connected to the opposite end of the support for supporting the opposite end of the roller.

7. A device as in claim 6, comprising a stop mechanism mounted on the saw support and including a spring pressed plunger for engaging the openings in the teeth retaining members of the saw to selectively position the teeth relatively to said rollers, a lever for retracting said plunger out of engagement with the saw, and means for adjusting said plunger horizontally and vertically of the support.

8. A device as in claim 6, comprising a conveyor for moving the carrier toward and away from the saw to position said rollers relatively to the teeth thereof, and an antifriction roller mounted in said carrier beneath the guide rollers for engaging an edge of the file for supporting and holding it out of engagement with the carrier while sharpening the teeth.

VICTOR MITCHELL TAYLOR.